(12) United States Patent  (10) Patent No.: US 7,527,433 B2
Rampulla et al.  (45) Date of Patent: May 5, 2009

(54) CONNECTOR FOR OPTICAL FIBRES

(75) Inventors: Alberto Rampulla, Milan (IT);
Giacomo Antonio Rossi, Milan (IT)

(73) Assignee: Pirelli & C. S.p.A., Milan (IT)

( * ) Notice: Subject to any disclaimer, the term of this patent is extended or adjusted under 35 U.S.C. 154(b) by 0 days.

(21) Appl. No.: 10/584,401

(22) PCT Filed: Dec. 24, 2003

(86) PCT No.: PCT/EP03/14998

§ 371 (c)(1),
(2), (4) Date: May 15, 2007

(87) PCT Pub. No.: WO2005/064378

PCT Pub. Date: Jul. 14, 2005

(65) Prior Publication Data

US 2007/0274663 A1    Nov. 29, 2007

(51) Int. Cl.
G02B 6/38        (2006.01)
(52) U.S. Cl. ............................ 385/71; 385/53; 385/55; 385/70
(58) Field of Classification Search .................. 385/53, 385/55, 70, 71
See application file for complete search history.

(56) References Cited

U.S. PATENT DOCUMENTS 6,491,442 B1 * 12/2002 Murakami et al. ............ 385/58
6,814,497 B2 * 11/2004 Takeda et al. ................. 385/58
7,210,855 B2 * 5/2007 Rossi et al. .................... 385/53

FOREIGN PATENT DOCUMENTS

| EP | 0 969 298 | 1/2000 |
| EP | 0 829 742 | 1/2006 |
| WO | WO 03/014791 | 2/2003 |

* cited by examiner

*Primary Examiner*—Jennifer Doan
(74) *Attorney, Agent, or Firm*—Finnegan, Henderson, Farabow, Garrett & Dunner, L.L.P.

(57) ABSTRACT

A connector for optical fiber is described. The connector has a main body having a first fiber supporting element for supporting, within a fiber supporting seat, a first portion of at least one optical fiber and leaving an end portion of the at least one optical fiber project from the main body. The connector further has a second fiber supporting element for supporting the end potion of the at least one optical fiber. The second fiber supporting element is slidably associated with the main body and mobile between a first operational position wherein the end portion of the at least one optical fiber is supported by the second fiber supporting element and a second operational position wherein at least an end part of said end portion projects from said connector. The main body comprises a seat for hosting the second fiber supporting element when the second fiber supporting element is moved from the first operational position to the second operational position. The seat is located below the fiber supporting seat of the first fiber supporting element.

16 Claims, 5 Drawing Sheets

SECTION A-A

SECTION B-B

SECTION A-A

CONNECTOR FOR OPTICAL FIBRES

CROSS REFERENCE TO RELATED APPLICATION

This application is a national phase application based on PCT/EP2003/014998, filed Dec. 24, 2003, the content of which is incorporated herein by reference.

BACKGROUND OF THE INVENTION

1. Field of the Invention

The present invention relates to a connector for optical fibres. More specifically, the invention relates to a connector for optical fibres and a device for connecting one or more optical fibres to a respective connection component. The invention also relates to a fibre-optic communication line comprising the connector of the invention and to a distribution network comprising at least two fibre-optic communication lines of the invention.

2. Description of the Related Art

Throughout the present description and the subsequent claims, the term "connection component" will be used to generally indicate an optical component, such as for example an optical fibre or a lens, or a opto-electronic components, such as for example an optical source (laser) or a photo-detector (or photo-receiver or photo-diode). For the sake of simplicity, henceforth reference will be explicitly made to the optical connection between optical fibre and opto-electronic component, i.e. a device which carries out an optical-electrical and/or an electrical-optical conversion, such as an optical source or a photo-detector, respectively; the same principles can, however, be applied to the case of a connection between two optical fibres, or between an optical fibre and a lens.

As known, in the field of telecommunications, optical technology is currently used mainly for long-distance transmission of optical signals using the known properties of wide band provided by optical fibres. However, the research is moving towards the possibility of using optical technology also in the signal distribution networks from a common branch point to a plurality of user apparatuses (such as, for example, television and/or analogue and/or digital telephone signals) and for transmitting digital data between electronic equipments (such as, for example, the Personal Computers of a LAN network), in place of the commonly used electrical cables, such as, for example, coaxial or copper duplex cables.

Indeed, electrical cables have a relatively narrow band and they are becoming a bottleneck with respect to the band of signals to be transmitted. Moreover, they exhibit problems of electromagnetic interference, of impedance matching and they are difficult to be inserted into the appropriate raceways of a building since they are stiff. In addition, being bulky, they significantly reduce the number of cables which can be inserted into a raceway. Moreover, due to electrical safety requirements, they require the arrangement of separate raceways from those used for distributing electrical energy. Differently, fibre-optic cables are suitable for being inserted into the appropriate raceways of a building since they are not too bulky, they are flexible, light, free from electromagnetic interference and they have low bending losses. In addition, they are suitable for being inserted into the same raceways which are used for distributing electrical energy. Moreover, optical fibres have a potentially very large band, low attenuation values and they are transparent to the bit rate, to the format and to the transmission code.

The connection of an optical cable to an optical source and/or to a photo-detector is conventionally carried out by means of an optical connection device. Typically, an optical connection device is a device comprising two parts (henceforth referred to as connector and receptacle) which can be repeatedly connected to and disconnected from each other and which must be attached to one end of the optical cable and to the optical source or the photo-receiver, respectively.

In the specific case of mutual connection between two optical fibres, each of the two fibres is associated with a respective connector and the optical coupling is achieved by mutually connecting the two connectors by means of an intermediate connection element. Throughout the present description and the subsequent claims, the term "receptacle" is to be understood to include also such an intermediate element.

For example, an optical cable installation suitable for connecting, inside a building, a user apparatus to a central distribution apparatus (located, for example, in an office or in a flat and, respectively, in the cellar or in the loft), requires the implementation of the following steps: passing the optical cable along an appropriate raceway in the building; cutting the optical cable according to the desired length; clamping two connectors to the two ends of the cable, in the proximity of the user apparatus and of the central apparatus, respectively; optionally clamping the optical source and/or the photo-detector (if the optical source and the photo-detector are not already provided in appropriate receptacles) to two receptacles, in the proximity of the user apparatus and of the central apparatus, respectively; and, finally, connecting each optical connector with the respective receptacle for removably connecting the optical fibre with the source and/or the photo-detector, in the proximity of the central apparatus and of the user apparatus, respectively.

Connectors for optical fibre are known in the art. Some of these connectors are disclosed in the prior art documents discussed in the patent application No. WO 03/014791 of the same Applicant.

As disclosed in WO 03/014791, a drawback associated with these known connectors is that the end portion of the fibre intended to be coupled always protrudes from the fiber supporting element for a predetermined length, also when the connector is not associated with the receptacle. Particularly during the connector maintenance operations and during the initial steps for connecting the connector to the receptacle, such an end portion of fibre is particularly exposed to possible knocks or contamination, which can cause damage and/or breaking of the fibre.

In order to overcome such a problem, WO 03/014791 of the same Applicant discloses a connector equipped with a protection cover adapted to slide, without ever coming into contact with the bare fibre, between a first position, wherein the fibre is housed inside the cover, and a second position, wherein an end portion of bare fibre is completely uncovered (i.e. directly accessible from any direction) and thus ready to be optically coupled. Advantageously, the presence of the slidable cover protects the bare fibre from possible knocks or contamination which can cause damage or breaking of such a fibre during the steps of connecting the connector to the distribution network.

However, Applicants have remarked that a drawback associated to the connector of WO 03/014791 is that, when the connector is not inserted into the receptacle, the end portion of the fibres projecting from the main body, while protected by the cover, is not supported. The length of the fibre end portion projecting from the connector is predetermined to provide also an excess of fibre with respect to the length which is strictly necessary to realise the optical connection, in order to cause the fibre to slightly arch when this come into contact with the active surface of the connection component thus generating a force which keeps the fibre pressed against the active surface of the connection component. The required projected end portion of optical fibre can be even of 10 mm in length. This end portion of fibre can be subjected to bending or inflection and/or oscillation, which can cause problems of efficiency as well as breaking of the fibre, especially if microcracks exist in this portion of fibre.

EP 0 969 298 discloses a connector for optical fibres comprising an outer member including a clamping element for clamping an optical fibre bunch, a fibre supporting member for holding a portion of optical fibres remote from their connecting end and an aligning member which is held by the outer member so as to be movable along the optical fibres. The aligning member carries out positioning of the connecting end of the optical fibres. The aligning member is urged by a spring in a direction to project from the outer member. Connection of each optical fibre of the connector to a counterpart optical fibre is carried out by connecting the connector to a receptacle housing the counterpart optical fibre. When connecting the connector to the receptacle, the aligning member is moved in a direction opposite to the foregoing direction against the urging force applied by the spring so that the connecting end of the optical fibre is projected from the aligning member.

SUMMARY OF THE INVENTION

The Applicant has noted that, although this connector realises a suitable protecting action of the end portion of the optical fibre before connecting the optical fibre to the counterpart optical fibre, a gap must be provided between the fibre supporting element and the fibre aligning member to allow the aligning member to slide towards the fibre supporting element when the connector is connected to the receptacle. This gap must have a length which is at least equal to the length of the fibre end portion to be projected. The longer is the length of fibre end portion to be projected to achieve a suitable coupling with the counterpart fibre, the larger is the gap to be provided in the connector between the clamping element and the aligning member, that is the larger is the longitudinal size of the connector.

The Applicant has studied how to manufacture a connector which, besides allowing the risks of damage and/or breaking of the fibres during the maintenance operations and when working to be reduced, has a longitudinal size smaller than that of EP 0 969 298. The Applicant has realised that this object may be achieved by providing the connector with a seat for housing the element which supports the end portion of an optical fibre, when this is retracted to expose the end portion of optical fibre to be connected. Specifically, the Applicant has realised that the above identified object may be achieved by locating the above mentioned seat below the fibre supporting element which holds the portions of optical fibres remote from the connecting end thereof.

Therefore, the present invention relates, in a first aspect thereof, to a connector for optical fibre, comprising:

a main body for housing a fibre-optic cable, said main body comprising a first fibre supporting element for supporting, within a fiber supporting seat extending along a longitudinal direction of the connector, a first portion of at least one optical fibre of said fibre-optic cable and leaving an end portion of said at least one optical fibre project from said main body;

a second fibre supporting element for supporting said end portion of said at least one optical fibre, said second fibre supporting element being slidably associated with said main body and mobile between a first operational position wherein said end portion of said at least one optical fibre is supported by said second fibre supporting element and a second operational position wherein at least an end part of said end portion of at least one optical fibre projects from said connector;

characterised in that said main body comprises a seat for housing said second fibre supporting element when said second fibre supporting element is moved from said first operational position to said second operational position, said seat being located below said fiber supporting seat of said first fibre supporting element.

Advantageously, when the connector of the present invention is not inserted into the appropriate receptacle for realising the optical connection between the optical fibre associated with the connector and the connection component associated with the receptacle, the end portion of the optical fibre to be connected is supported by the movable second fibre supporting element, thus avoiding possible (and dangerous) oscillations and/or knocks of the optical fibre, which can cause damage or breaking of such a fibre during the steps of connecting and disconnecting the connector to the distribution network (i.e. during the repeated movement of insertion and withdrawal of the connector into and from the receptacle) and during the maintenance operations. The optical connection between the optical fibre associated with the connector and the connection component associated with the receptacle is then made possible by simply inserting the connector into the receptacle: by doing so the second fibre supporting element is moved from the first position to the second position, thus leaving the end portion of optical fibre to project beyond the end surface of the connector.

More advantageously, since upon insertion of the connector of the present invention into the receptacle the second fibre supporting element is moved into the seat provided into the main body of the connector below the fiber supporting seat formed in the first fibre supporting element, the longitudinal size of the connector of the present invention can be drastically reduced. Indeed, differently from the connector of EP 0 969 298, there is no need to provide the connector of the present invention with a gap between the first fibre supporting element and the second fibre supporting element.

Throughout the present description and the following claims, the term "below" used to define the position of the seat for the second fibre supporting element with respect to the fiber supporting seat formed in the first fibre supporting element, is referred to the orientation of the connector as shown on the attached figures. However, it is manifest that the connector, in use, may take whatever orientation other than that shown.

Preferably, the second fibre supporting element comprises:

a base element which is slidably associated with said main body and mobile between said first and second operational positions along a longitudinal direction of said connector, and a fibre contacting element associated with said base element and comprising at least one longitudinal groove for housing said end portion of optical fibre when said base element is at said first operational position and leaving said end portion of optical fibre project from said connector when said base element is at said second operational position.

The second fibre supporting element is thus advantageously comprised of two distinct elements associated to each other, the base element and the fibre contacting element, respectively. The base element is intended to slide with respect to the main body while the fibre contacting element is intended to support the fibres and to maintain them aligned when the connector is not inserted into the receptacle. The fibre contacting element is made of any material which is suitable not to damage the fibre during sliding.

Preferably, said at least one longitudinal groove is a V-groove, that is the groove has a sectional V-shape. Advantageously, this shape ensures high positioning precision (i.e. in the order of 100 μm) while being not difficult to be realised (for example by injection plastic moulding).

Preferably, when said base element is at said first operational position said fibre contacting element is inclined of a predetermined angle α with respect to said longitudinal direction. This inclination advantageously allows a vertical force to be generated on the end portion of optical fibre. This vertical force keeps this fibre end portion perfectly lying into the longitudinal groove of the second fibre supporting element also when the connector is accidentally knocked.

More preferably, said predetermined angle α is lower than or equal to 6°. This value has been found to be the highest acceptable value when length of optical fibre to be projected is of 10 mm in order not to stress the optical fibre.

Preferably, said seat comprises an upper surface inclined of an angle greater than or equal to said predetermined angle α. This upper surface advantageously guides the fibre contacting element into the seat when the base element is moved from the first to the second operational position.

Preferably, said fibre contacting element is pivotally associated with said base element by means of a hinge provided at a free end portion of said fibre contacting element and at a corresponding free end portion of said base element.

More preferably, said hinge comprises a pair of opposite pins formed onto opposite sides of said fibre contacting element at said free end portion thereof and adapted to be housed into a pair of opposite pin seats formed onto opposite side walls of said base element at said free end portion thereof.

Preferably, the main body comprises, at an entrance portion of said seat, a base member for supporting a fibre entrance portion of said fibre contacting element when said base element is at said first operational position and for guiding said fibre contacting element into said seat when said base element is moved from said first operational position to said second operational position.

Preferably, said at least one longitudinal groove comprises a first tapered portion at said free end portion of said fibre contacting element for allowing the fibre not to be stressed from the bottom when the fibre contacting element rotates around the above mentioned hinge during the movement of the base element from the first to the second operational position.

Preferably, said at least one longitudinal groove comprises a second tapered portion at said fibre entrance portion of said fibre contacting element for facilitating the positioning of the end portion of optical fibre into the longitudinal groove of the fibre contacting element in the assembly procedure of the fibre-optic cable to the connector.

Preferably, the connector of the present invention further comprises an elastic element interposed between said main body and said second fibre supporting element for keeping, in rest state, said second fibre supporting element at said first operational position.

In a preferred embodiment thereof, the connector of the present invention comprises a cover which is associated with said second fibre supporting element and mobile between said first and second operational positions together with said second fibre supporting element, said cover being provided with at least one opening for the passage of said at least an end part of said end portion of at least one optical fibre. Preferably, the base element of said second fibre supporting element is integrally formed with said cover. Preferably, said cover is of the type disclosed in the patent application WO 03/014791 of the same applicant, which is hereby incorporated by reference.

More preferably, the connector of the present invention is a connector of the type disclosed in the above mentioned application WO 03/014791 of the same Applicant, further comprising the above discussed second fibre supporting element and the above discussed seat for this element provided in the main body below the first fibre supporting element. Therefore all of the advantages discussed in WO 03/014791 with respect to the connector disclosed therein are fully achievable by the connector of the present invention too.

In a second aspect thereof, the present invention relates to a device for connecting an optical fibre, comprising a connector adapted to be associated with at least one optical fibre and a receptacle adapted to house said connector so as to realise an optical connection along an optical connection axis between said at least one optical fibre and at least one connection component housed into the receptacle, characterised in that said connector is the connector of the present invention.

Preferably, said receptacle is of the type discussed in the above mentioned application WO 03/014791, which, as already stated, is hereby incorporated by reference.

In a third aspect thereof, the present invention relates to a fibre-optic communication line, comprising at least one cable including at least one optical fibre, characterised in that said al least one cable is terminated at at least one of its free ends with the connector of the present invention.

In a fourth aspect thereof, the present invention relates to a distribution network comprising at least two fibre optic communication lines of the above mentioned type and a branching unit associated with said at least two fibre optic communication lines.

BRIEF DESCRIPTION OF THE DRAWINGS

Further characteristics and advantages of the present invention will become clearer from the following detailed description of one of its preferred embodiments, made with reference to the attached drawings. In such drawings.

DETAILED DESCRIPTION OF THE INVENTION

Figure 1:
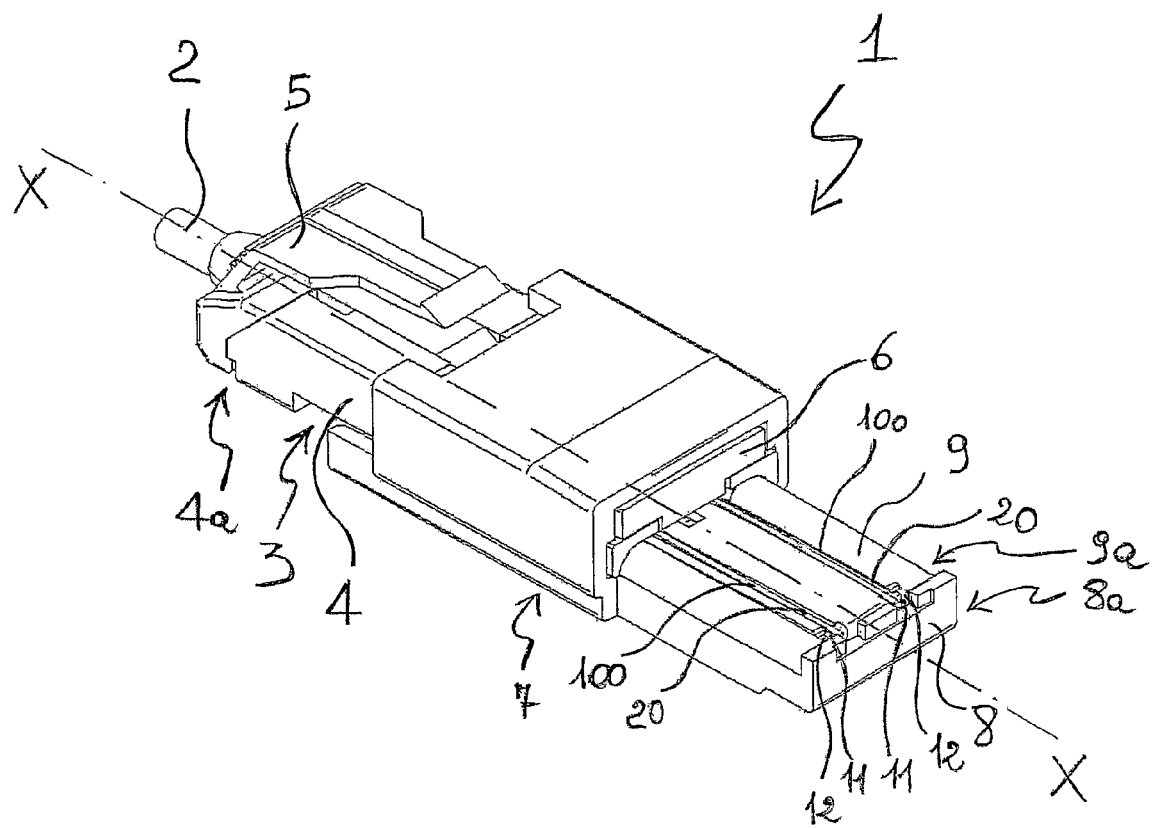
FIG. 1 is a schematic perspective view of a connector according to the present invention in a first operative configuration thereof.

In the figures, with numeral reference 1 a connector for optical fibre according to the present invention is indicated. A fibre-optic cable 2 is shown associated with the connector 1.

In the embodiment illustrated in the attached figures, the optical cable 2 is a dual-fibre cable comprising two optical fibres 100 which are preferably single mode fibres, a plastic protection tube to cover both the fibres and a plastic outer sheath. Each optical fibre 100 comprises a glass core, a glass cladding and an acrilate outer coating. While the following description will be made with explicit reference to a dual-fibre cable, it would be clear to a man skilled in the art that what described is equally applicable to a mono-fibre or multi-fibre cable.

The optical cable 2 comprises, moreover, a plurality of longitudinal reinforcement fibres (not shown) which are flexible and resistant to traction. Such reinforcement fibres, advantageously made of Kevlar™, are arranged between the plastic tube and the plastic outer sheath.

For example, the optical cable 2 is of the type described in the patent application EP 0 829 742 of the same Applicant.

The cable 2 has an end part from which the plastic outer sheath, the Kevlar™ fibres, the plastic tube which contains the two fibres and each fibre's layers of acrilate have been removed for a predetermined length through conventional processes, so as to expose the glass surface of the cladding of the two optical fibres 100. The cable 2, therefore, in its operational configuration before being associated with the connector 1, comprises an end portion of a predetermined length provided with a pair of bare end portions of optical fibres 100.

While the following detailed description will be made with explicit reference to fibres having bare end portions of a predetermined length, the Applicant has verified that what said also applies either to fibres having a very short bare end portion (preferably single mode fibres) and to fibres completely covered with the acrilate protective layer, i.e. wherein the length of the bare end portion is zero (preferably multimodal fibres). In particular, what said applies to single mode fibres wherein the bare end portion is greater than or equal to 0.5 mm in length (this is considered to be an acceptable minimum value for achieving an extremely precise optical alignment between the single mode fibre and the optical connection component housed into the receptacle), and preferably shorter than 3 mm, and to multimodal fibre completely covered and having just a bare end face. By the term "multimodal fibre" the Applicant wishes to indicate any fibre having a core with a diameter greater than about 10 μm, allowing the propagation of more than one mode and providing for a better tolerance with respect to the optical alignment with the connection component.

Figure 3:
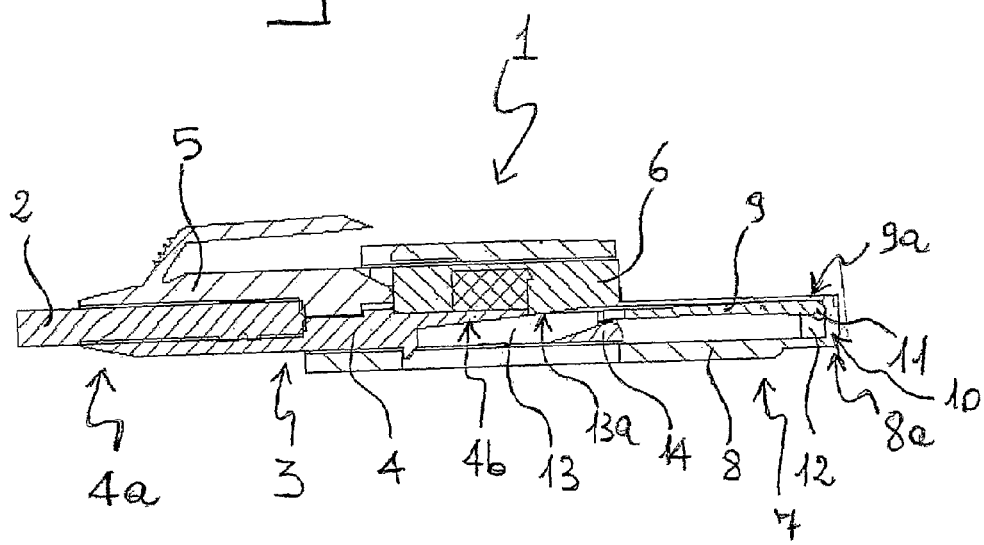
FIG. 3 is a longitudinal sectional view of the connector of FIG. 1 taken along the lines A-A of FIG. 2.

As better illustrated in FIG. 3, the connector 1 basically comprises a main body 3 for housing the fibre-optic cable 2 and supporting a first portion of the optical fibres 100 coming out from the cable 2. Specifically, the main body 3 comprises a first fibre supporting element 4 of the type disclosed in WO 03/014791. The first fibre supporting element 4 is provided with an upstream portion 4a for housing the cable 2 and a downstream portion 4b for supporting said first portions of optical fibres 100.

The cable 2 is clamped between the upstream portion 4a of the first fibre supporting element 4 and an upper clamping element 5 of the type disclosed in WO 03/014791.

The main body 3 comprises, moreover, an upper body 6 (see FIG. 3) adapted to be associated with the first fibre supporting element 4 at the portion 4b thereof. Also this upper body 6 is of the type disclosed in WO 03/014791.

As in the connector disclosed in WO 03/014791, on the upper face of the first fibre supporting element 4, and specifically at the downstream portion 4b thereof, a pair of substantially parallel seats or grooves, not visible in the attached figures, are formed: preferably said grooves are V-grooves and are suitable for cooperating, when the upper body 6 is associated with the first fibre supporting element 4, with a respective pair of seats or grooves (also substantially parallel and preferably V-grooves) formed on a corresponding lower face of the upper body 6, so as to define a pair of longitudinal channels for housing and guiding said first portions of the optical fibres 100.

Therefore, when the cable 2 is associated to the connector 1, each of said first portions of optical fibre 100 is housed into one of the above identified longitudinal channel, while an end portion of the optical fibres 100 projects out of the main body 3.

Figure 4:
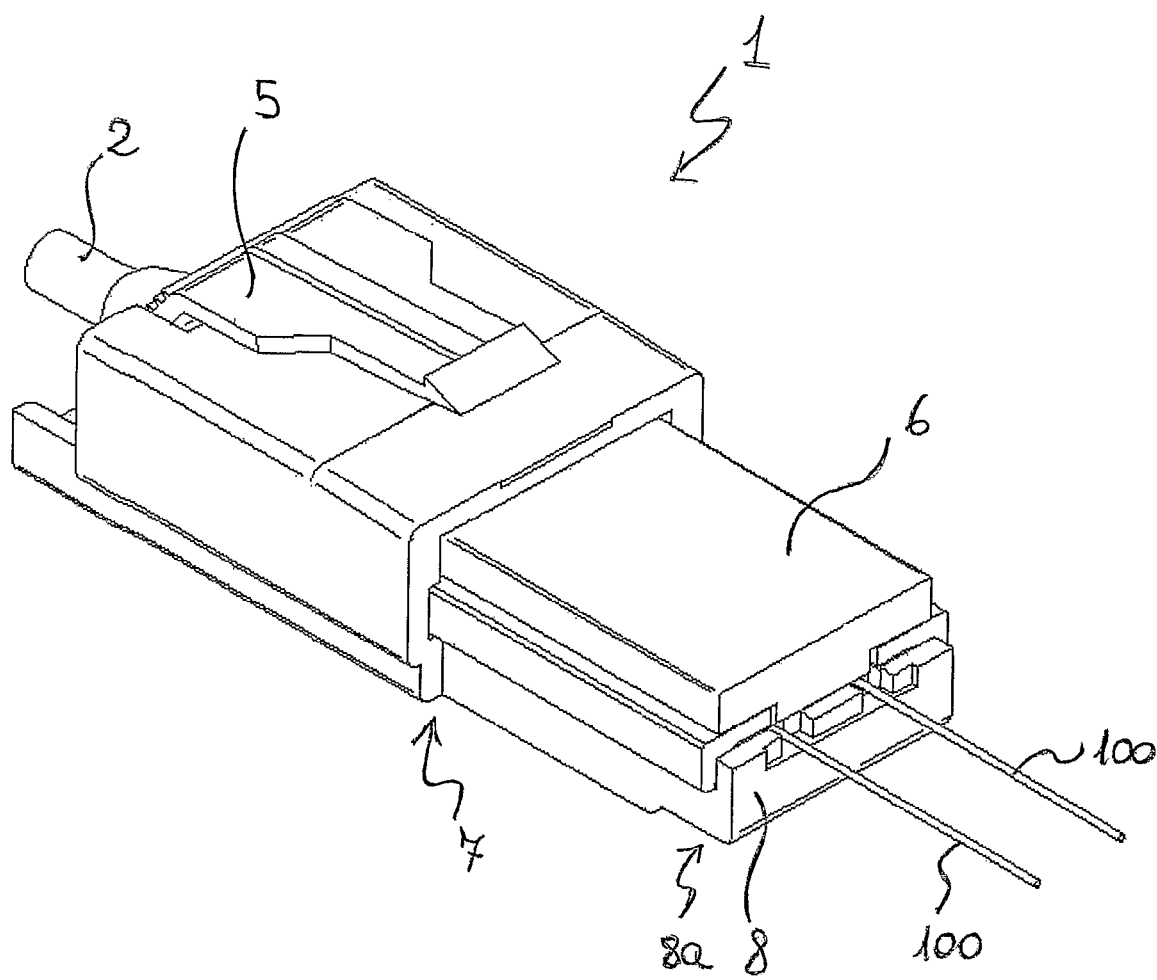
FIG. 4 is a schematic perspective view of the connector of FIG. 1 in a second operative configuration.
Figure 5:
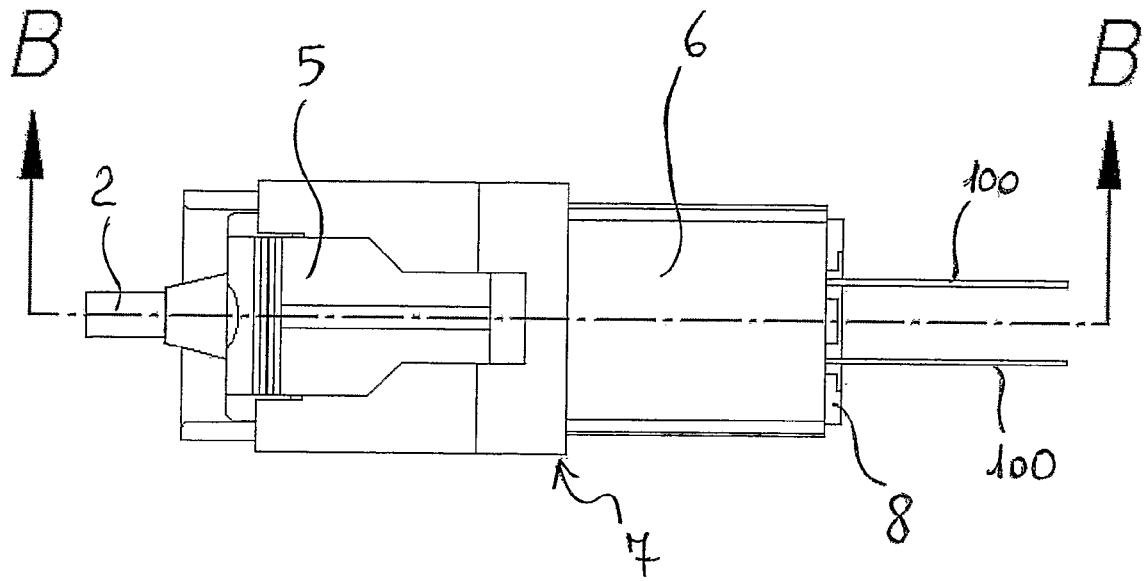
FIG. 5 is a schematic view from above of the connector of FIG. 4.

To avoid damage or breaking of the fibres 100 caused by possible (and dangerous) oscillations and/or knocks of the projected end portion thereof during the steps of connecting and disconnecting the connector 1 to the distribution network (i.e. during the repeated movement of insertion and withdrawal of the connector 1 into and from the receptacle) and during the maintenance operations, the connector 1 of the present invention further comprises a second fibre supporting element 7 for supporting said end portions of the optical fibres 100 when the connector 1 is not inserted into a receptacle. The second fibre supporting element 7 is slidably associated with the fibre supporting element 4 so as to be mobile between a first operational position (shown in FIGS. 1-3) wherein said end portions of optical fibres 100 are supported by said second fibre supporting element 7 and a second operational position (shown in FIGS. 4-6) wherein at least an end part of said end portions of optical fibre 100 projects from the connector, so as to make possible the optical connection with the connection component housed into the receptacle.

In the example illustrated in the attached figures, the second fibre supporting element 7 comprises a slidable base element 8 and a fibre contacting element 9 associated with each other. The base element 8 is slidably associated the first fibre supporting element 4 and is mobile between said first and second operational positions along a longitudinal direction X-X of the connector 1. An elastic element (not illustrated) is interposed between the first fibre supporting element 4 and the base element 8 to keep, in rest state, the base element 8 at its first operational position.

Figure 2:
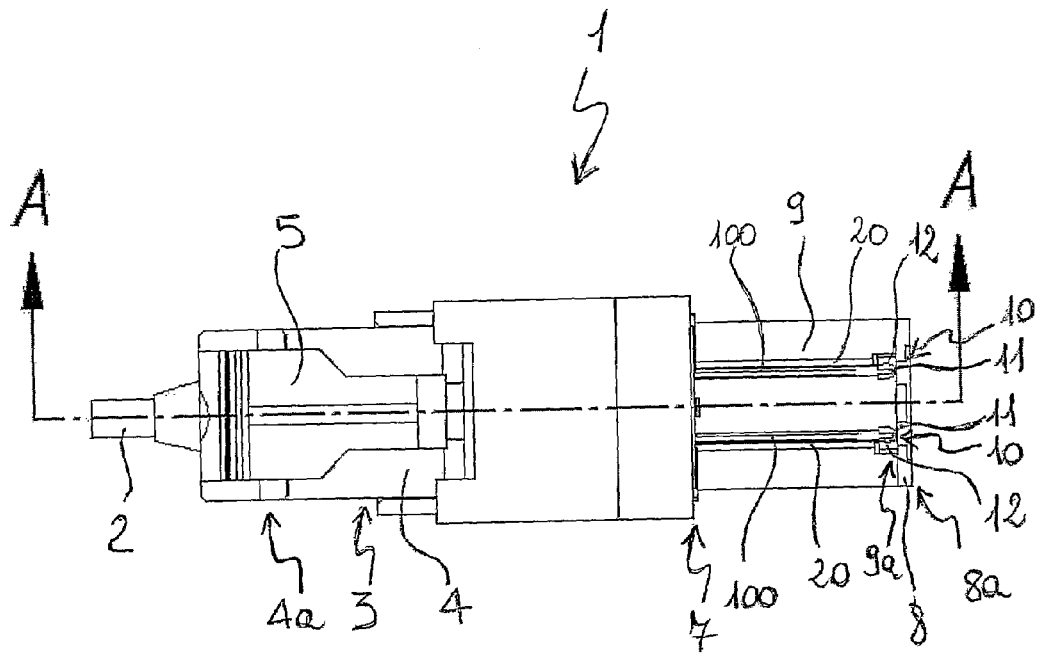
FIG. 2 is a schematic view from above of the connector of FIG. 1.

As better illustrated in FIGS. 2 and 3, the fibre contacting element 9 has a free end 9a which is pivotally associated by a hinge 10 with a corresponding free end 8a of the base element 8. Specifically, the fibre contacting element 9 comprises a pair of opposite pins 11 (see FIGS. 7-8) formed at the free end portions 9a thereof and adapted to be housed into a pair of opposite pin seats 12 formed onto opposite side walls of the base element 8 at the free end portion 8a thereof.

On the upper surface thereof, the fibre contacting element 9 comprises a pair of longitudinal V-grooves 20 for housing said end portions of optical fibres 100 when the base element 8 is at said first operational position and leaving said end portions of optical fibres 100 project from said connector 1 when the base element 8 is at said second operational position.

Figure 6:
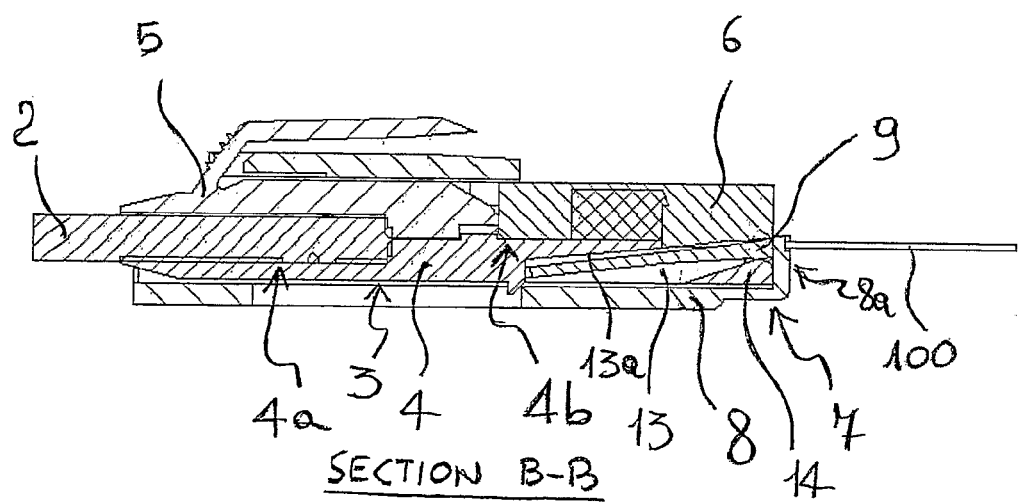
FIG. 6 is a longitudinal sectional view of the connector of FIG. 4 taken along the line B-B of FIG. 5.

As shown on FIGS. 3 and 6 a seat 13 is formed in the main body 3 below the longitudinal seats or grooves that are formed in the first fibre supporting element 4 for housing and guiding the portions of optical fiber. Seat 13 is adapted for housing the fibre contacting element 9 when the base element 8 is pushed from the first to the second operational position.

At the entrance portion of the seat 13, a base member 14 is provided for supporting the end portion 9b of the fibre contacting element 9 opposed to the hinged portion 9a when the base element 8 is at its first operational position. Therefore, at the first operational position of the base element 8, the fibre contacting element has the end portion 9a which is hinged to end portion 8a of the base element 8 and the opposed end portion 9b which rests on the base member 14.

The base member 14 is shaped as a chute so that when the base element 8 is moved from the first to the second operational position the fibre contacting element 9 slides over this chute and goes into the seat 13.

In a preferred embodiment of the connector of the present invention, the height of the base member 14 is selected so that when the base element 8 is at its first operational position the fibre contacting element 9 is inclined of a predetermined angle α with respect to the longitudinal direction X-X. For example, when the length of optical fibre to be projected is of 10 mm the angle α is lower than or equal to 6°. Alternatively, the height of the base member 14 can be selected so that when the base element 8 is at its first operational position the fibre contacting element 9 is parallel to the longitudinal direction X-X. In this case, the depth of the longitudinal grooves 20 formed onto the upper surface of the fibre contacting element 9 is varied along the longitudinal direction X-X so as to define an angle of inclination equal to α.

The seat 13 comprises an upper surface 13a inclined of an angle greater than or equal to the predetermined angle α to allow housing of the fibre contacting element 9 when the base element 8 is moved from the first to the second operational position. Therefore, when the base element 8 is moved from the first to the second operational position, the fibre contacting element 9 is guided into the seat 13 by the inclined upper surface 13a thereof while rotating around the hinge 10 defined by the pins 11 and the pin seats 12.

Figure 7:
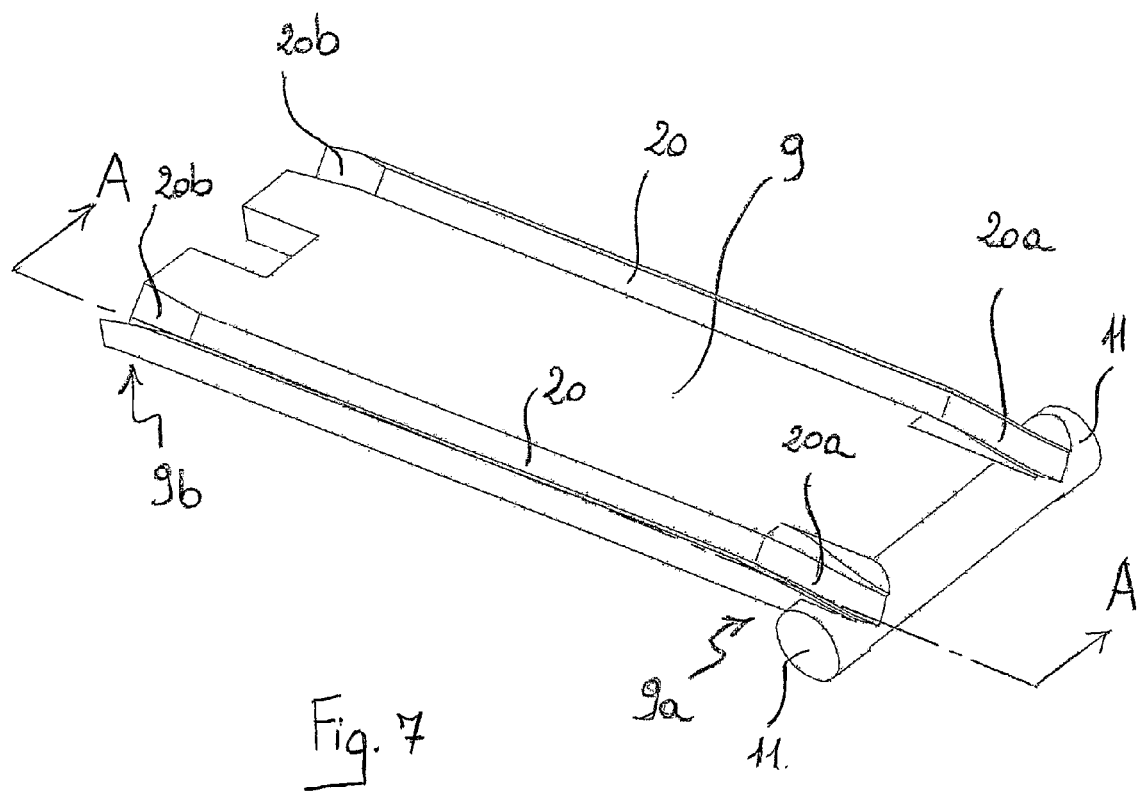
FIG. 7 is a schematic perspective view of a structural component of the connector of FIG. 1.
Figure 8:
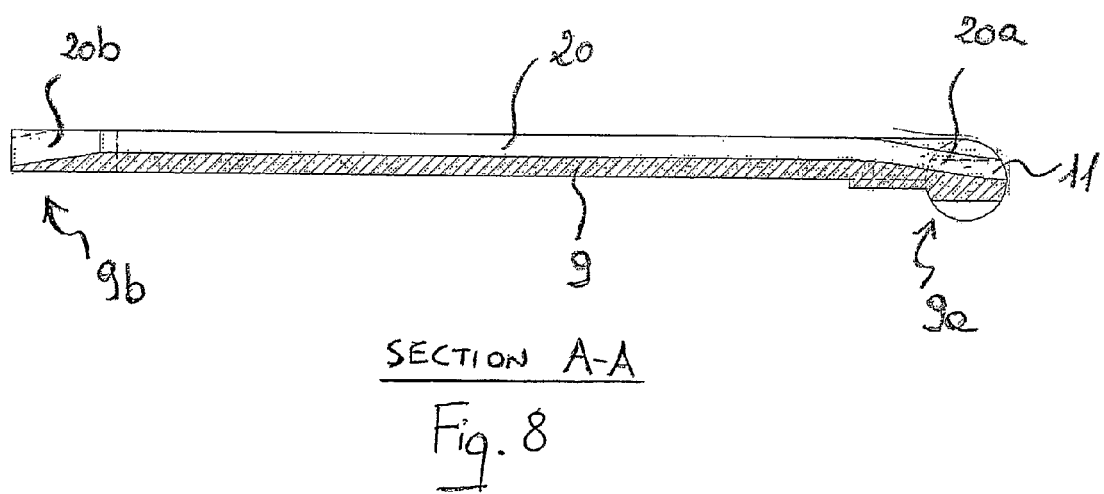
FIG. 8 is a longitudinal sectional view taken along the line A-A of FIG. 7.

As better illustrated in FIGS. 7-8, each of the longitudinal V-grooves 20 formed onto the fibre contacting element 9 comprises a first tapered portion 20a at the hinged free end portion 9a of the fibre contacting element 9 for allowing the fibre not to be stressed from the bottom when the fibre contacting element 9 rotates around the hinge 10 provided at a free end portion 9a of the fibre contacting element 9 and at the corresponding free end portion 8a of the base element 8 during the movement of the base element 8 from the first to the second operational position. Each of the longitudinal grooves 20 further comprises a second tapered portion 20b at the free end portion 9b of the fibre contacting element 9 for facilitating the positioning of the end portions of optical fibres 100 into the longitudinal grooves 20 of the fibre contacting element 9 in the assembly procedure of the fibre-optic cable 2 to the connector 1.

In a preferred and not illustrated embodiment thereof, the connector of the present invention comprises a cover which is associated with the base element 8 so as to be mobile between said first and second operational positions. The cover is provided with openings for the passage of the end portions of optical fibres 100. Preferably, said cover is of the type disclosed in the patent application WO 03/014791 of the same applicant, which is hereby incorporated by reference.

The connector of the present invention can be a connector of the type disclosed in the above mentioned application WO 03/014791 of the same Applicant, which further comprises the above discussed second fibre supporting element 7 and the above discussed seat 13 and base member 14. Therefore all of the advantages discussed in WO 03/014791 with respect to the connector disclosed therein are fully achievable by the connector of the present invention too.

The connector 1 described above is adapted to be associated with a receptacle to allow the optical connection of the optical fibres 100 with respective opto-electronic components housed in the receptacle along respective optical connection axes. Preferably, the receptacle is of the type illustrated and discloses in WO 03/014791 of the same Applicant, which is therefore hereby incorporated by reference.

An optical signal distribution system comprises, for example, at least two optical cables suitable for connecting, inside a building, a central optical signal distribution apparatus (situated, for example, in the cellar or in the loft), with a plurality of user apparatuses (situated in respective offices or flats). Each optical cable is terminated, at least at the user apparatus end, by means of a connector of the type described above. Advantageously, one or more optical cables are terminated at both ends by means of optical connectors of the type described above.

During the insertion of the connector 1 into the receptacle, the base element 8 moves from the first to the second operational position and the fibre contacting element 9 slides over the base member 14 and goes into the seat 13; in such a way the end portions of optical fibres 100 are projected from the connector 1 so as to be optically connected to the respective opto-electronic connection components housed into the receptacle. The receptacle is adapted to be mounted in a flat; it is therefore sized in such a way as to be housed in a conventional domestic electricity distribution system.

When the connector 1 is removed from the receptacle, the base element 8 moves from the second operational position to the first operational position and the fibre contacting element 9 moves out from the seat and supports the end portions of the optical fibres 100.

The invention claimed is:

1. A connector for optical fibre, comprising:
a main body for housing a fibre-optic cable, said main body comprising a first fibre supporting element for supporting, within a fiber supporting seat extending along a longitudinal direction of the connector, a first portion of at least one optical fibre of said fibre-optic cable and leaving an end portion of said at least one optical fibre project from said main body; and
a second fibre supporting element for supporting said end portion of said at least one optical fibre, said second fibre supporting element being slidably associated with said main body and mobile between a first operational position wherein said end portion of said at least one optical fibre is supported by said second fibre supporting element and a second operational position wherein at least an end part of said end portion of at least one optical fibre projects from said connector,
said main body comprising a seat for housing said second fibre supporting element when said second fibre supporting element is moved from said first operational position to said second operational position,
wherein at least a portion of said second fibre supporting element is positioned above or below a portion of said first fibre supporting element when said second fibre supporting element is in said second operational position.

2. The connector according to claim 1, wherein said second fibre supporting element comprises:
a base element which is slidably associated with said main body and mobile between said first and second operational positions along said longitudinal direction of said connector; and
a fibre contacting element associated with said base element and comprising at least one longitudinal groove for housing said end portion of optical fibre when said base element is at said first operational position and leaving said end portion of optical fibre project from said connector when said base element is at said second operational position.

3. The connector according to claim 2, wherein, when said base element is at said first operational position, said fibre contacting element is inclined at a predetermined angle with respect to said longitudinal direction.

4. The connector according to claim 3, wherein said seat comprises an upper surface inclined at an angle greater than or equal to said predetermined angle.

5. The connector according to claim 2, wherein said fibre contacting element is pivotally associated with said base element by means of a hinge provided at a free end portion of said fibre contacting element and at a corresponding free end portion of said base element.

6. The connector according to claim 5, wherein said hinge comprises a pair of opposite pins formed onto opposite sides of said fibre contacting element at said free end portion thereof and adapted to be housed into a pair of opposite pin seats formed onto opposite side walls of said base element at said free end portion thereof.

7. The connector according to claim 2, wherein said main body comprises, at an entrance portion of said seat, a base member for supporting a fibre entrance portion of said fibre contacting element when said base element is at said first operational position and for guiding said fibre contacting element into said seat when said base element is moved from said first operational position to said second operational position.

8. The connector according to claim 5, wherein said at least one longitudinal groove comprises a first tapered portion at said free end portion of said fibre contacting element.

9. The connector according to claim 7, wherein said at least one longitudinal groove comprises a second tapered portion at said fibre entrance portion of said fibre contacting element.

10. The connector according to claim 1, further comprising an elastic element interposed between said main body and said second fibre supporting element for keeping, in rest state, said second fibre supporting element at said first operational position.

11. The connector according to claim 1, further comprising a cover which is associated with said second fibre supporting element and mobile between said first and second operational positions together with said second fibre supporting element, said cover being provided with at least one opening for the passage of said at least an end part of said end portion of at least one optical fibre.

12. A device for connecting an optical fibre, comprising a connector according to claim 1, adapted to be associated with at least one optical fibre and a receptacle adapted to house said connector so as to realise an optical connection along an optical connection axis between said at least one optical fibre and at least one connection component housed into the receptacle.

13. A fibre-optic communication line, comprising at least one cable comprising at least one optical fibre, wherein said at least one cable is terminated at at least one of its free ends with a connector according to claim 1.

14. A distribution network, comprising:
a connector for optical fibre, comprising:
a main body for housing a fibre-optic cable, said main body comprising a first fibre supporting element for supporting, within a fiber supporting seat extending along a longitudinal direction of the connector, a first portion of at least one optical fibre of said fibre-optic cable and leaving an end portion of said at least one optical fibre project from said main body; and
a second fibre supporting element for supporting said end portion of said at least one optical fibre, said second fibre supporting element being slidably associated with said main body and mobile between a first operational position wherein said end portion of said at least one optical fibre is supported by said second fibre supporting element and a second operational position wherein at least an end part of said end portion of at least one optical fibre projects from said connector,
said main body comprising a seat for housing said second fibre supporting element when said second fibre supporting element is moved from said first operational position to said second operational position,
wherein at least a portion of said second fibre supporting element is positioned above or below a portion of said first fibre supporting element when said second fibre supporting element is in said second operational position;
at least two fibre optic communication lines, each comprising:
at least one cable comprising at least one optical fibre, wherein said at least one cable is terminated at least one of its free ends with the connector for optical fibre; and
a branching unit associated with said at least two fibre optic communication lines.

15. The connector according to claim 2, wherein said fibre contacting element is pivotally associated with said base element by means of a hinge provided at a free end portion of said fibre contacting element and a free end portion of said base element; wherein said main body comprises, at an entrance portion of said seat, a base member for supporting a fibre entrance portion of said fibre contacting element when said base element is at said first operational position and for guiding said fibre contacting element into said seat when said base element is moved from said first operational position to said second operational position; and wherein said at least one longitudinal groove comprises a first tapered portion at said free end portion of said fibre contacting element.

16. The connector according to claim 15, wherein said at least one longitudinal groove comprises a second tapered portion at said fibre entrance portion of said fibre contacting element.

* * * * *